United States Patent [19]

Iwai et al.

[11] Patent Number: 5,721,988
[45] Date of Patent: Feb. 24, 1998

[54] DATA IMPRINTING DEVICE OF CAMERA

[75] Inventors: Fumio Iwai; Katsuji Ozawa; Michihiro Shiina, all of Omiya, Japan

[73] Assignee: Fuji Photo Optical Co., Ltd., Saitama-ken, Japan

[21] Appl. No.: 688,220

[22] Filed: Jul. 29, 1996

Related U.S. Application Data

[63] Continuation of Ser. No. 353,338, Dec. 5, 1994, abandoned, which is a continuation of Ser. No. 84,467, Jul. 1, 1993, abandoned.

[30] Foreign Application Priority Data

Jul. 3, 1992 [JP] Japan ................................ 4-200495

[51] Int. Cl.$^6$ ................................................. G03B 17/24
[52] U.S. Cl. ................................... 396/277; 396/310
[58] Field of Search ............................. 354/105, 106, 354/76, 289.1, 289.11, 289.12; 396/277, 279, 280, 281, 287, 310, 315, 319, 321

[56] References Cited

U.S. PATENT DOCUMENTS

| | | | |
|---|---|---|---|
| 4,825,233 | 4/1989 | Kanai et al. | 354/106 |
| 4,855,772 | 8/1989 | Hashimoto et al. | 354/173.1 |
| 4,916,474 | 4/1990 | Miyazawa et al. | 354/412 |
| 5,023,637 | 6/1991 | Lorton et al. | 354/106 |
| 5,103,250 | 4/1992 | Arifuku et al. | 354/106 |
| 5,155,513 | 10/1992 | Matsumura et al. | 354/106 |
| 5,293,191 | 3/1994 | Umetsu | 354/173.1 |
| 5,302,990 | 4/1994 | Satoh et al. | 354/106 |
| 5,325,141 | 6/1994 | Shiina et al. | 354/173.1 |

Primary Examiner—Howard B. Blankenship

[57] ABSTRACT

A data imprinting device of a camera, when a free mode is set, is responsive to operation by each camera user, and prepares character strings as desired by the camera user and stores the prepared character strings to an electrically rewritable non-volatile memory E$^2$PROM. When the free mode is set, character strings stored in the E$^2$PROM are read out from the E$^2$PROM according to operation by the camera user, and displayed on an imprint display unit and used for imprinting. As character strings prepared by the camera user are stored in the E$^2$PROM, the character strings are preserved without being destroyed even when a power source is shut down because a battery is unloaded or used up.

7 Claims, 7 Drawing Sheets

DATA IMPRINTING DEVICE OF CAMERA

This application is a continuation of application Ser. No. 08/353,338 filed on Dec. 5, 1994, now abandoned, which is a continuation of application Ser. No. 08/084,467, filed on Jul. 1, 1993, now abandoned.

BACKGROUND OF THE INVENTION

The present invention relates to a data imprinting device of a camera, in particular, relates to a data imprinting device which has a free mode for imprinting optional character strings prepared by each user on pictures.

Recently, cameras which are provided with a date module having a free mode for imprinting optional character strings prepared by each camera user, in addition to a date mode for imprinting a year, a month and a day and a time mode for imprinting a day, an hour and a minute, have become used. In the case of a camera having a date module like this, the camera user prepares desired character strings by selecting optional characters from alphabet and numerals, and the prepared character strings are stored in a RAM of the date module.

For a camera which has a date module like this, there is a problem that character strings prepared by the camera user are stored in a RAM of the date module, the character strings are broken when a power source is shut down because a battery is unloaded or the battery is used up, and in result the character strings are to be prepared anew. Besides this, as the capacity of the RAM of the date module for storing the prepared character strings is small and the number of memorizable character strings is 5 character strings or so, sometimes the camera user experiences inconvenience.

SUMMARY OF THE INVENTION

It is an object of the present invention to overcome the disadvantage and limitations of the prior art by a new and improved data imprinting device of a camera.

Another object of the present invention is to provide a data imprinting device of a camera which can avoid the destruction of character strings prepared by the camera user even if a power source is shut down, and yet enable the storage of more character strings.

The above and other objects are attained by a data imprinting device of a camera which has plural imprint modes, including a free mode for imprinting character strings prepared by the camera user and imprints data displayed on an imprint display unit on pictures according to each imprint mode which is set selectively comprising: an electrically rewritable non-volatile memory E²PROM; character string preparing/writing means, responsive to the setting of said free mode and an external operation, for preparing a character string as desired by the camera user and for writing a prepared character string into said E²PROM; character string reading means, responsive to the setting of said free mode and an external operation, for reading a character string stored in said E²PROM; and display controlling means, responsive to said character string preparing/writing means and said character string reading means, for displaying a character string which is being prepared and for displaying a character string read out from said E²PROM on said imprint display unit.

The present invention will become more fully understood from the detailed description given hereinbelow and the accompanying drawings which are given by way of illustration only, and thus are not limitative of the present invention and wherein.

BRIEF DESCRIPTION OF THE DRAWINGS

The foregoing objects, features and attendant advantages of the present invention will be appreciated as the same become better understood by means of the following description and accompanying drawings wherein which are given by way of illustration only and thus are not limiting of the present invention and.

DETAILED DESCRIPTION OF THE INVENTION

Figure 1:
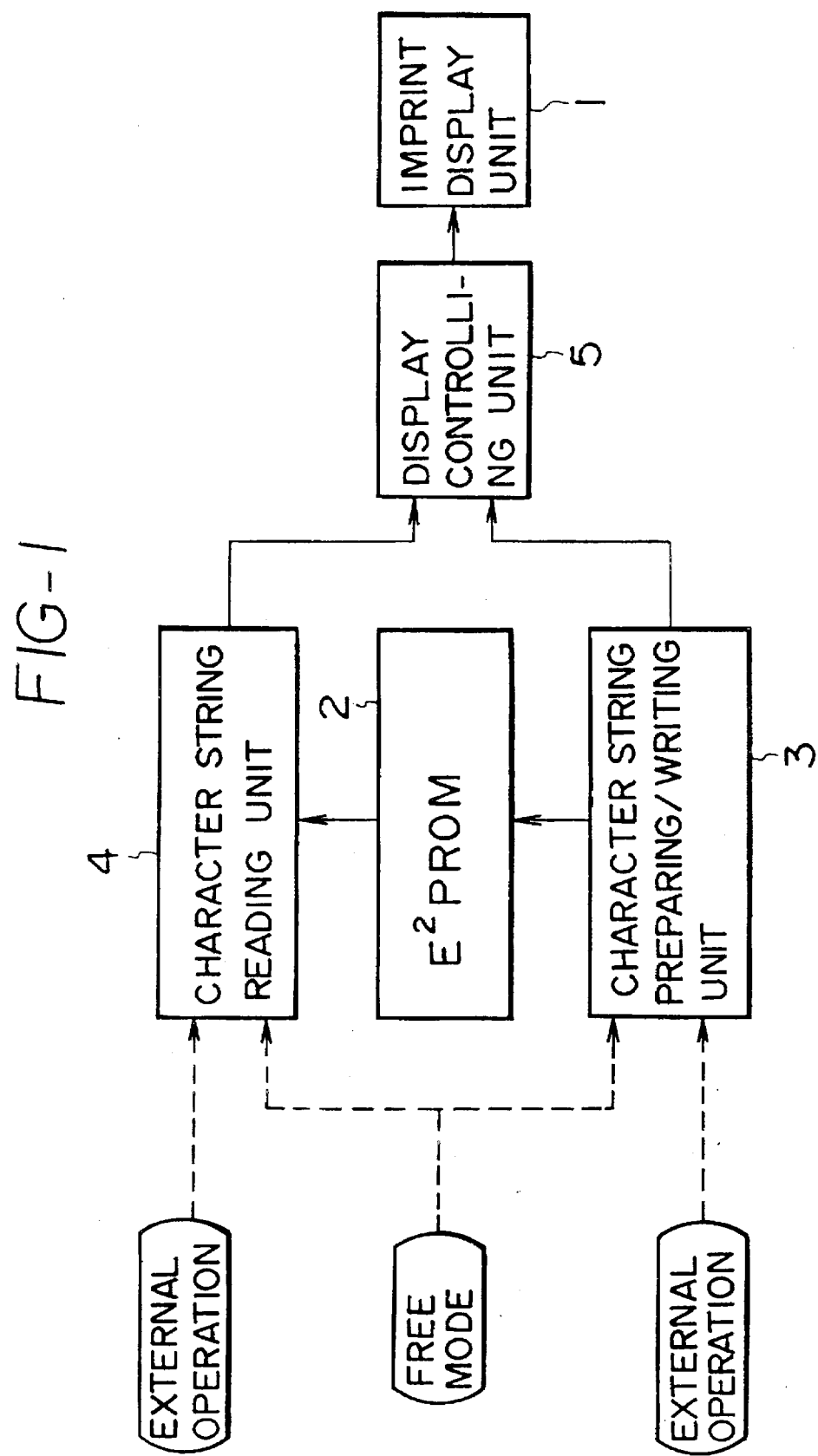
FIG. 1 is a block diagram showing a fundamental embodiment of a data imprinting device of a camera according to the present invention.

In a fundamental embodiment of FIG. 1, a reference numeral 1 is an imprint display unit, a reference numeral 2 is an electrically rewritable non-volatile memory E²PROM 2, a reference numeral 3 is a character string preparing/writing unit, a reference numeral 4 is a character string reading unit, and a reference numeral 5 is a display control unit. As imprint modes, plural modes are prepared, including a free mode for imprinting character strings which are prepared by each camera user on pictures. On the imprint display unit 1, data corresponding to each imprint mode which is selectively set by the camera user are displayed, and the displayed data are imprinted on pictures. The character string preparing/writing unit 3, when the free mode is set, is responsive to an operation by the camera user, and prepares a character string which the camera user desires and writes the prepared character string in the E²PROM. The prepared character string is displayed on the imprint display unit 1 by the display control unit 5. Character strings stored in the E²PROM 2, when the free mode is set, are read out from the E²PROM 2 by the character string reading unit 4 which is responsive to an operation by the camera user, displayed on the imprint display unit 1, and used for imprinting. Since character strings prepared by the camera user are stored in the E²PROM 2, the character strings are preserved and not broken even when a power source is shut down because a battery is unloaded or used up. In addition, more character strings can be stored according to the memory capacity of the E²PROM 2. Contents of the foregoing fundamental embodiment will be better understood by means of the undermentioned preferred embodiment.

Figure 2:
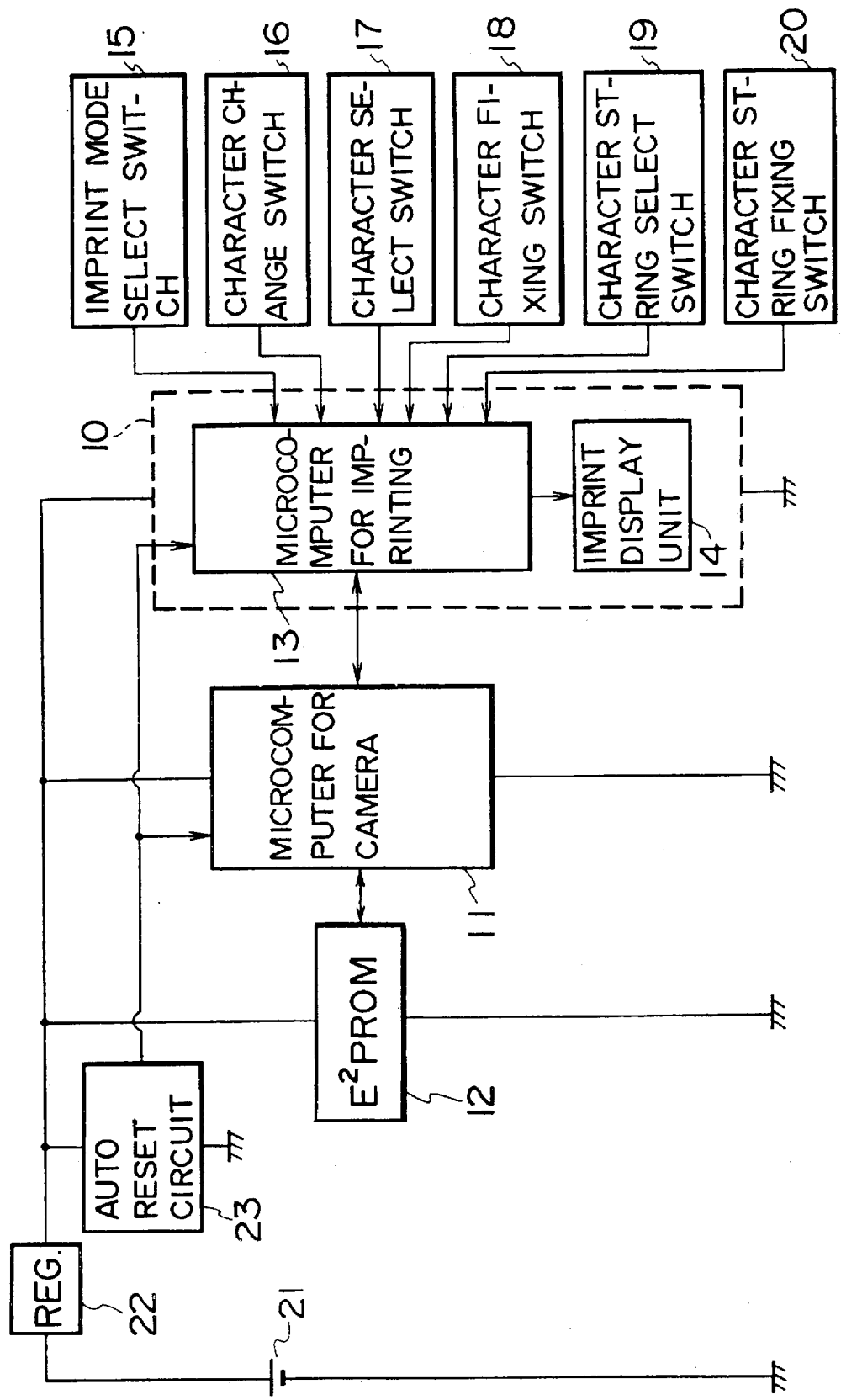
FIG. 2 is a block diagram showing a preferred embodiment of a data imprinting device of a camera according to the present invention.

In a preferred embodiment of FIG. 2, a reference numeral 10 is a date module, a reference numeral 11 is a microcomputer for camera, and a reference numeral 12 is an electrically rewritable non-volatile memory E²PROM.

The date module 10 has a microcomputer for imprinting 13 and an imprint display unit 14. The microcomputer for imprinting 13 receives an imprint mode select signal from an imprint mode select switch 15, a character change signal from a character change switch 16, a character select signal from a character select switch 17, a character fixing signal from a character fixing switch 18, a character string select signal from a character string select switch 19, and a character string fixing signal from a character string fixing switch 20. The imprint display unit 14 is controlled by the microcomputer for imprinting 11. The microcomputer for imprinting 13 is connected with the microcomputer for camera 11 for communicating with it. An E²PROM 12 is read/written by the microcomputer for camera 11. A reference numeral 21 is a battery. The battery 21 supplies a power source to the date module 10, the microcomputer for camera 11 and the E²PROM 12 via a regulator 22. A reference numeral 23 is an auto reset circuit. The auto reset circuit 23, when the battery 21 is loaded, gives a power on reset signal to the microcomputer for camera 11 and the microcomputer for imprinting 13.

The microcomputer for imprinting 13 has the following functions. The microcomputer for imprinting 13 selects a date module, a time mode, and free mode and an off mode according to the flow chart of FIG. 3. The date mode is a mode for imprinting a year, a month and a day on pictures. The time mode is a mode for imprinting a day, an hour and a minute on pictures. The free mode is a mode for imprinting character strings prepared by selecting optional characters including alphabet and numerals by the camera user. The off mode is a mode for imprinting nothing on pictures. The microcomputer for imprinting 13, according to the flow charts of FIG. 4 and FIG. 5, prepares a character string which the camera user desires, transmits the prepared character string to the microcomputer for camera 11 for writing to the E²PROM 12, and reads character strings which are written in the E²PROM 12 through communication with the microcomputer for camera 11. The microcomputer for imprinting 13, when the battery 21 is loaded, also loads a character string of a prescribed address, written in the E²PROM 12, to a RAM of the microcomputer for imprinting 13 through communication with the microcomputer for camera 11 according to the flow chart of FIG. 6.

The microcomputer for camera 11 has the following functions. The microcomputer for camera 11, according to the flow chart of FIG. 7, receives a character string from the microcomputer for imprinting 13 and writes the received character string to the E²PROM 12. The microcomputer for camera 11, according to the flow chart of FIG. 8, reads a character string in the E²PROM 12 which is requested by the microcomputer for imprinting 13, and transmits the read character string to the microcomputer for imprinting 13. The microcomputer for camera 11, when the battery 21 is loaded, also transmits a character string of a prescribed address, written in the E²PROM 12, to the microcomputer for imprinting 13 according to the flow chart of FIG. 9.

To the E²PROM 12, prepared character strings are written in addresses A1–An.

Figure 3:
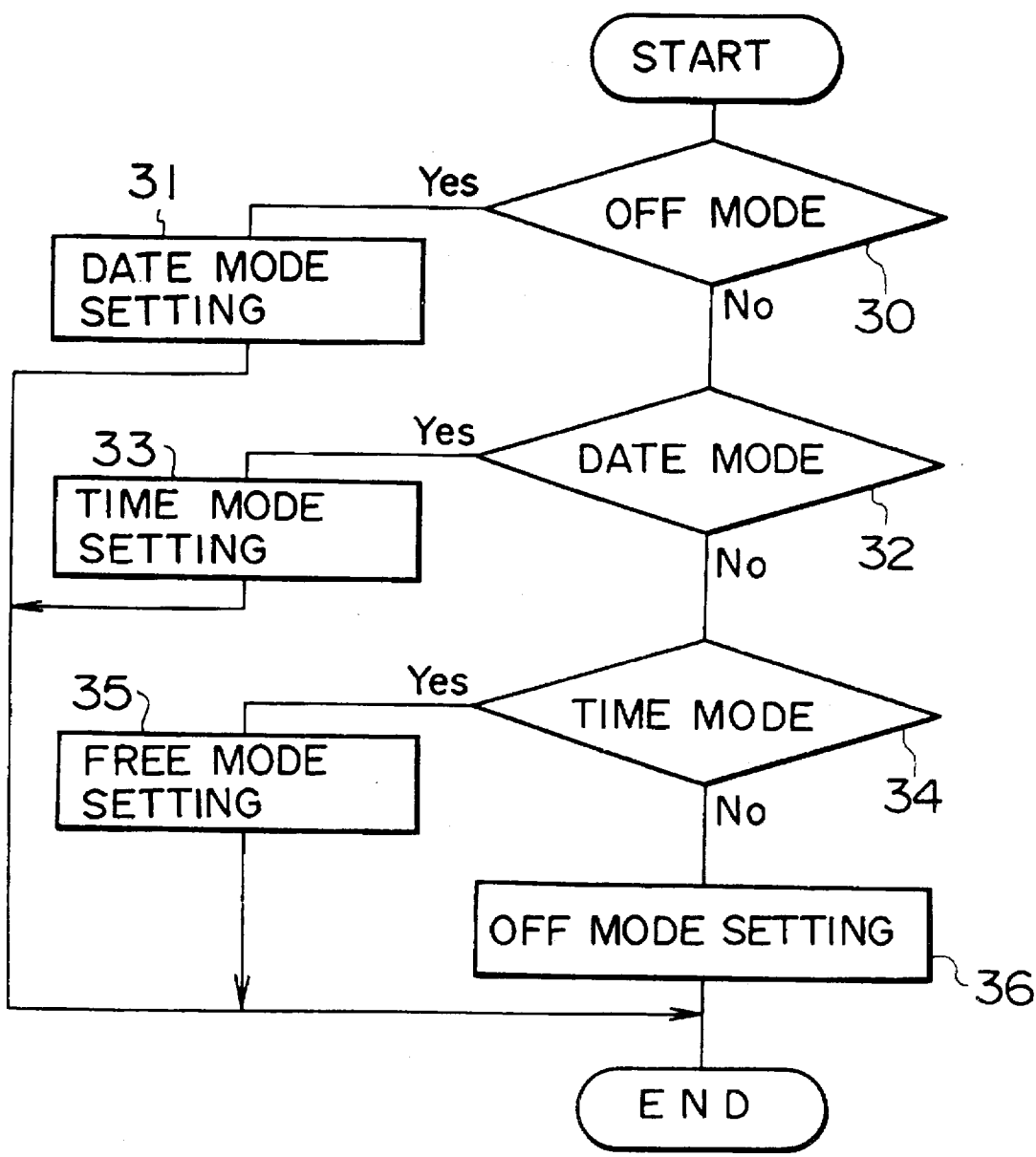
FIG. 3 is a flow chart of a microcomputer for imprinting of FIG. 2, showing a processing of imprint mode selection.

FIG. 3 is a flow chart of the microcomputer for imprinting 13 of the date module 10, showing a processing of imprint mode selection. The microcomputer for imprinting 13, when the mode select switch 15 is made on, starts the processing of imprint mode selection, and judges whether or not the current imprint mode is the off mode at a step 30. If the current imprint mode is the off mode, the microcomputer for imprinting 13 sets the date mode at a step 31, displays a year, a month and a day on the imprint display unit 14 and finishes the processing of imprint mode selection. Or, if the current imprint mode is not the off mode, the microcomputer for imprinting 13 judges whether or not the current imprint mode is the date mode at a step 32. If the current imprint mode is the date mode, the microcomputer for imprinting 13 sets the time mode at a step 33, displays a day, an hour and a minute on the imprint display unit 14 and finishes the processing of imprint mode selection. If the current imprint mode is not the date mode, the microcomputer for imprinting 13 judges whether or not the current imprint mode is the time mode at a step 34. If the current imprint mode is the time mode, the microcomputer for imprinting 13 sets the free mode at a step 35, displays a character string which is stored in the RAM of the microcomputer for imprinting 13 and finishes the processing of imprint mode selection. If the current imprint mode is not the time mode, the microcomputer for imprinting 13, recognizing that the current imprint mode is the free mode, sets the off mode at a step 36, makes off the display of the imprint display unit 14 and finishes the processing of imprint mode selection. Thus, in the processing of imprint mode selection, imprint modes are set rotationally in an order of the off mode, the date mode, the time mode, the free mode and then returned to the off mode each time the imprint mode select switch 15 is made on.

Figure 4:
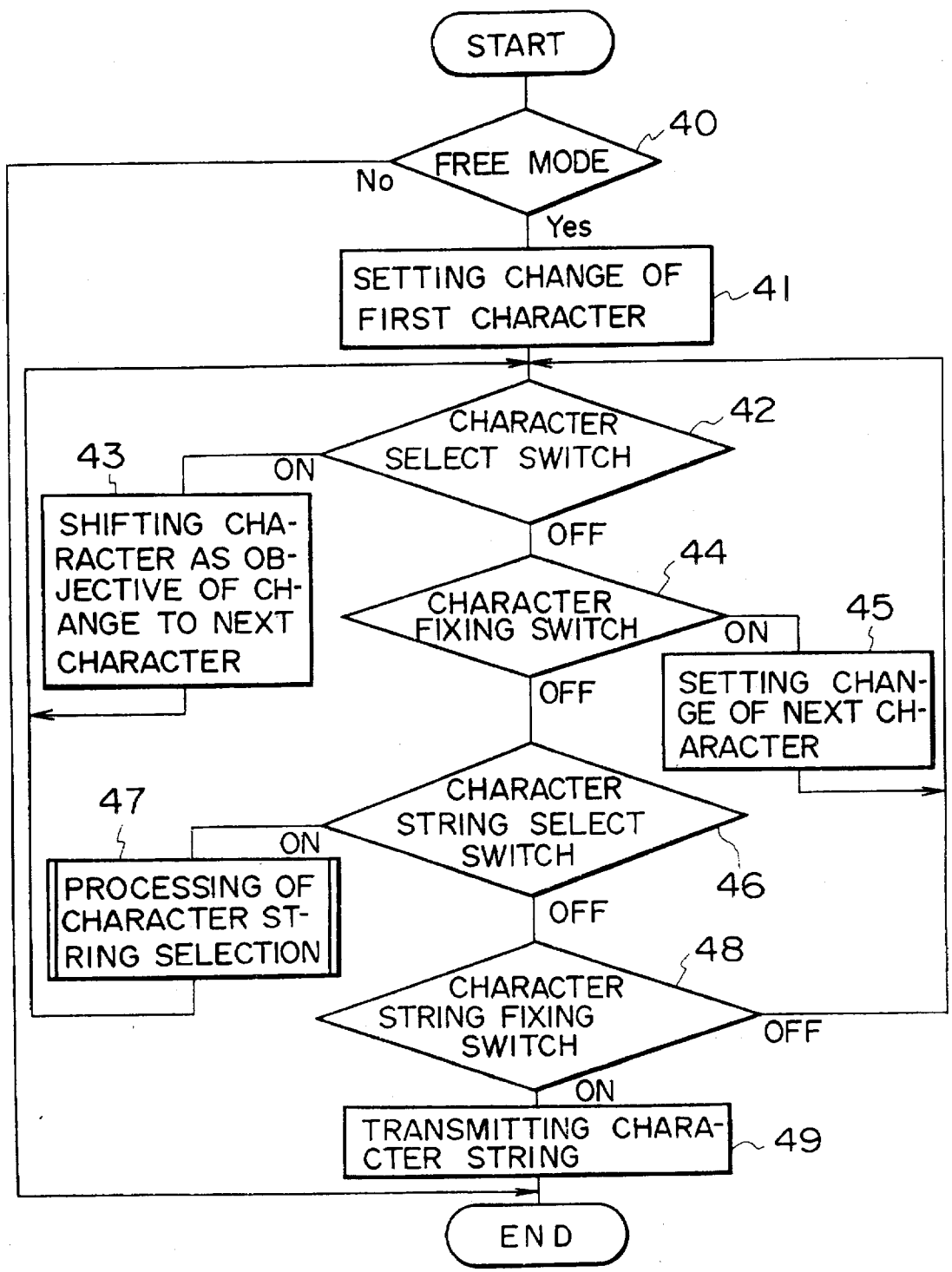
FIG. 4 is a flow chart of the microcomputer for imprinting of FIG. 2, showing a processing of character string preparation.
Figure 5:
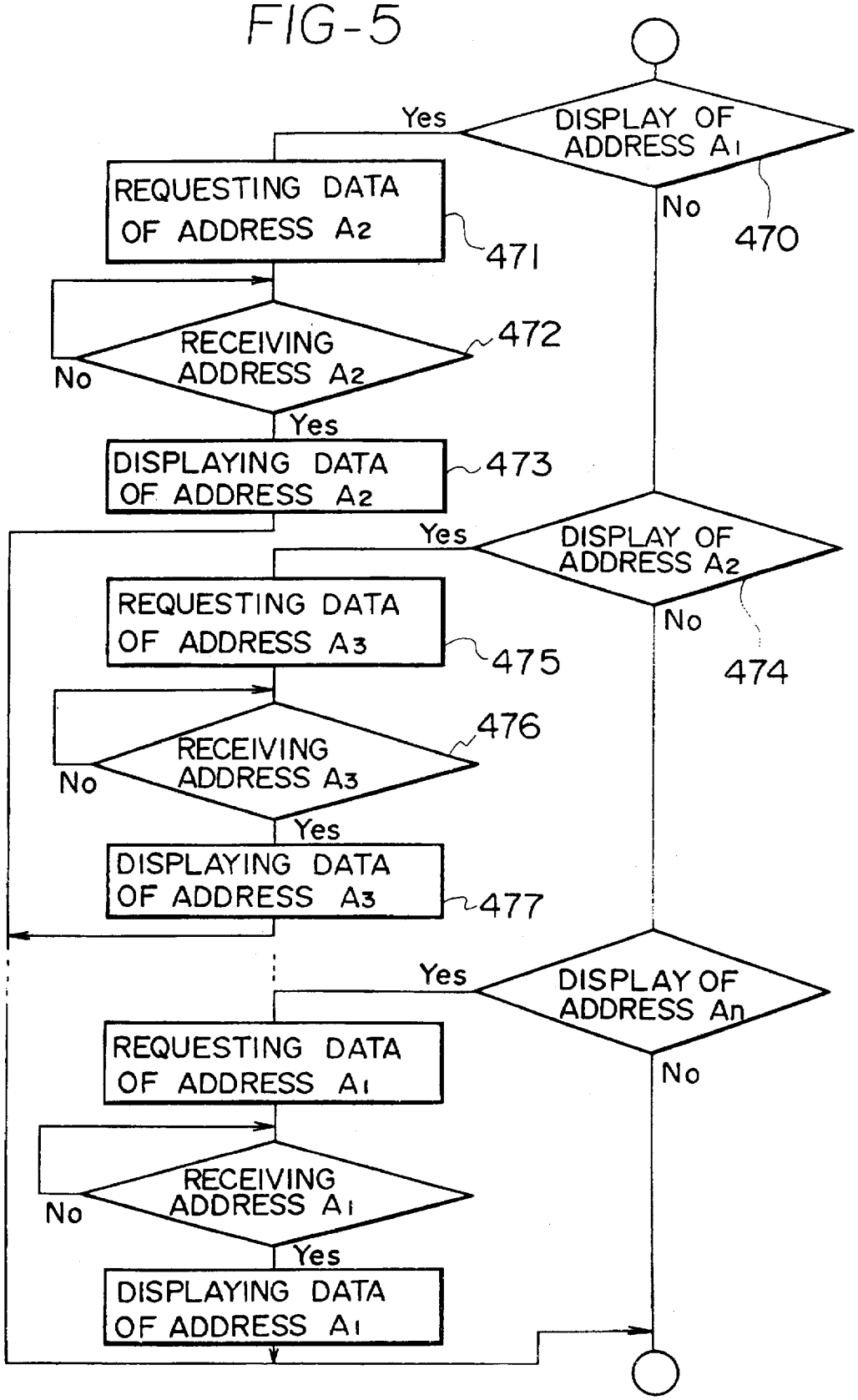
FIG. 5 is a flow chart of the microcomputer for imprinting of FIG. 2, showing the processing of character string selection of FIG. 4.

FIG. 4 and FIG. 5 are flow charts of the microcomputer for imprinting 13 of the date module 10, FIG. 4 showing the preparation processing of character string and FIG. 5 showing the selection processing of character strings of FIG. 4.

The microcomputer for imprinting 13 starts the processing of FIG. 4 when the character change switch 16 is made on, and judges whether or not the current imprint mode is the free mode at a step 40. If the current imprint mode is not the free mode, the microcomputer for imprinting 13 finishes the processing of FIG. 4 immediately without doing anything. If the current imprint mode is the free mode, the microcomputer for imprinting 13 sets the change of the first character at a step 41. Supposing, for example, that a character string which includes ten characters is prepared in this embodiment, the selection or change of the first character of ten characters is set at the step 41. The microcomputer for imprinting 13 enters a step 42 after the step 41, and judges whether the character select switch 17 is on or off in the step 42. When the character select switch 17 is made on, the microcomputer for imprinting 13 shifts a character as an objective of selection or change to the next character and displays the character on the imprint display unit 14 at a step 43, and then returns to the step 42. In this embodiment, alphabet and numerals are prepared as characters, and characters are shifted among these. Characters can be selected or changed or added according to the language of each country. At the step 43, if the character to be changed is "A", it is shifted to "B" when the character change switch 17 is made on. By the on operation of the character select switch 17, a desired character is selected out of alphabet and numerals. If the character select switch 17 is off, the microcomputer for imprinting 13 enters from step 42 to step 44, and judges whether the character fixing switch 18 is on or off at the step 44. When the character fixing switch 18 is made on, the microcomputer for imprinting 13 sets the change of the next character at a step 45, and then returns to the step 42. If the character fixing switch 18 is made on under a condition that the change of the first character is set, for example, the change of the second character is set at the step 45, and the second character is set to a desired character via steps 42 and 43. If the character fixing switch 18 is off, the microcomputer for imprinting 13 enters from step 44 to step 46, and judges whether the character string select switch 19 is on or off. When the character string select switch 19 is on, the microcomputer for imprinting 13 returns to the step 42 through the processing of character string selection of a step 47 which will be described in FIG. 5. If the character string select switch 19 is off, the microcomputer 13 enters from step 46 to step 48, and judges whether the character string fixing switch 20 is on or off at the step 48. When the character string fixing switch 20 is made on, the microcomputer for imprinting 13 transmits a character string which is displayed on the imprint display unit 14 to the microcomputer for camera 11 at a step 49, and finishes the processing of character string preparation. If the character string fixing switch 20 is off, the microcomputer for imprinting 13 returns from step 48 to step 42.

In the processing of character string selection of the step 47 of FIG. 4, a processing shown in FIG. 5 is executed. The microcomputer for imprinting 13 judges whether or not a display of the imprint display unit 14 is data of the address A1 of the E²PROM 12 in a step 470. If the display of the imprint display unit 14 is data of the address A1, the microcomputer for imprinting 13 requests the microcomputer for camera 11 the transmission of the data of the address A2 of the E²PROM 12 in a step 471, and through a waiting for receiving data of the address A2 of a step 472, displays the data of the address A2 of the E²PROM 12 on the imprint display unit 14 at a step 473 and finishes the processing of character string selection. If the display of the imprint display unit 14 is not data of the address A1, the microcomputer for imprinting 13 enters from step 470 to step 474, and judges whether or not the display of the imprint display unit 14 is data of the address A2 of the E²PROM 12. If the display of the imprint display unit 14 is data of the address A2, the microcomputer for imprinting 13 requests the microcomputer for camera 11 the transmission of data of the address A3 of the E²PROM 12 at a step 475, and through a waiting for receiving data of the address A3 of a step 476, displays the data of the address A3 of the E²PROM 12 on the imprint display unit 14 at a step 477 and finishes the processing of character string selection. Each time the character string select switch 19 is made on, the same processing is performed up to the address An of the E²PROM 12, and the microcomputer for imprinting 13 returns to the data display of the address A1 when data of the the address An of the E²PROM 12 is displayed on the imprint display unit 14.

Figure 6:
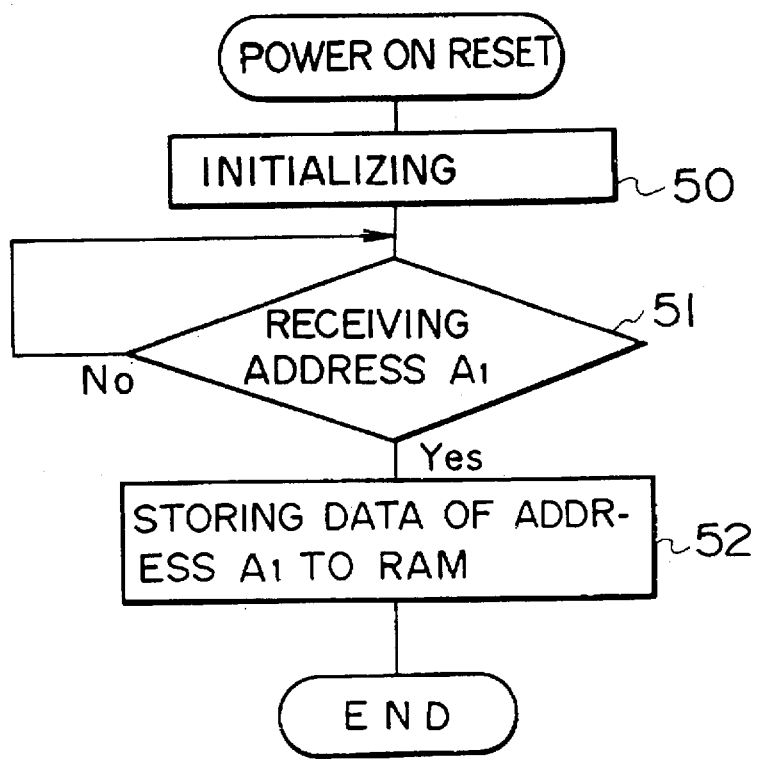
FIG. 6 is a flow chart of the microcomputer for imprinting of FIG. 2, showing a processing of power on reset.

FIG. 6 is a flow chart of the microcomputer for imprinting 13, showing the processing of power on reset. When the battery 21 is loaded, a power on reset signal is given from the auto reset circuit 23 to the microcomputer for imprinting 13. By this, the microcomputer for imprinting 13 starts the power on reset of FIG. 6, and through an initialization of a step 50 and a waiting for receiving data of the address A1 of the E²PROM 12 from the microcomputer for camera 11, enters a step 52. The microcomputer for imprinting 13 at a step 52 stores the data of address A1 of the E²PROM 12 to the RAM of the microcomputer for imprinting 13 and finishes the power on reset.

Figure 7:
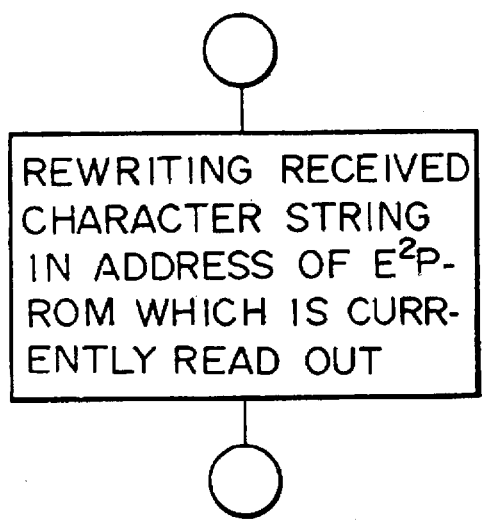
FIG. 7 is a flow chart of the microcomputer for camera of FIG. 2, showing a processing of writing to an E²PROM.

FIG. 7 is a flow chart of the microcomputer for camera 11, showing the processing of writing to the E²PROM 12. The microcomputer for camera 11, receiving a character string from the microcomputer for imprinting 13, rewrites the received character string to an address of the E²PROM 12 which is currently read out. For example, if a new character string is prepared based on data of the address A1 of the E²PROM 12 and the character string is transmitted from the microcomputer for imprinting 13 to the microcomputer for camera 11, the transmitted character string is rewritten to the address A1 of the E²PROM 12.

Figure 8:
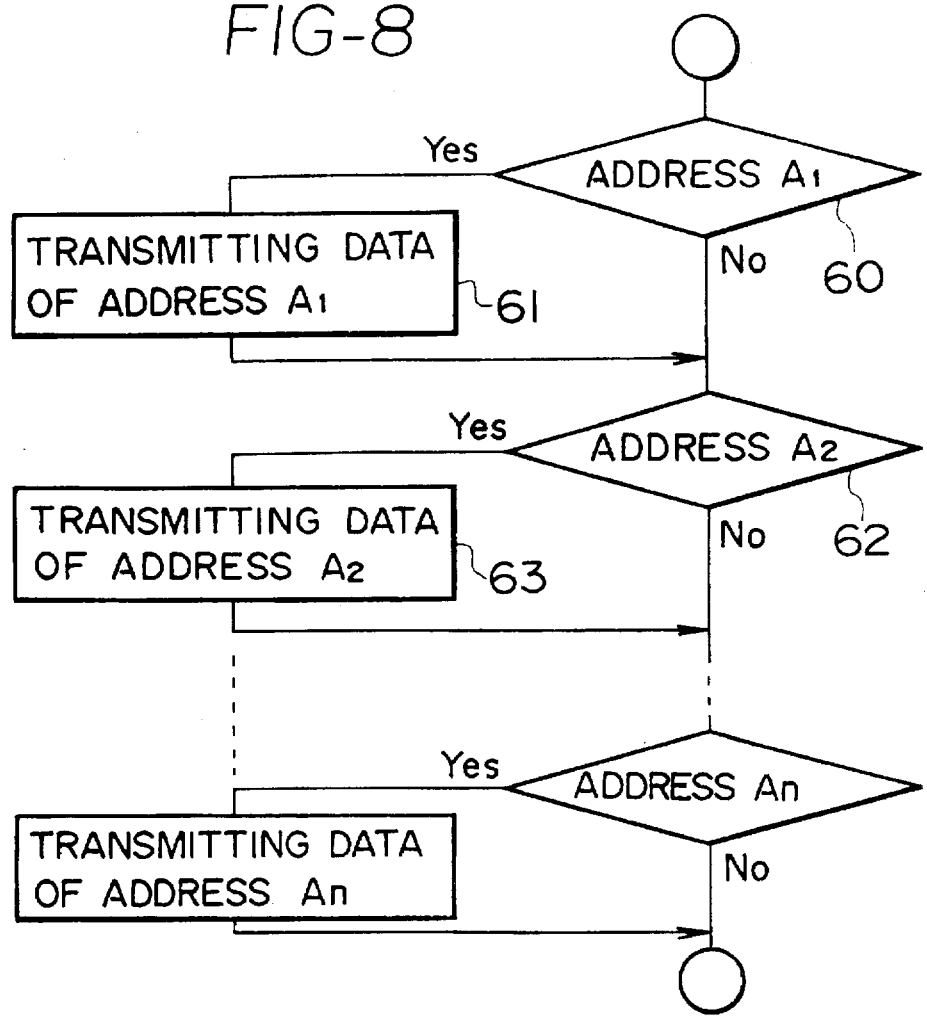
FIG. 8 is a flow chart of the microcomputer for camera of FIG. 2, showing a processing of transmission of character strings written in the E²PROM

FIG. 8 is a flow chart of the microcomputer for camera, showing the processing of transmitting character strings written in the E²PROM 12. The microcomputer for camera 11, when the transmission of data of the E²PROM 12 is requested from the microcomputer for imprinting 13, transmits data of addresses A1–An of the E²PROM 12 to the microcomputer for imprinting 13 according to the flow chart of FIG. 8. That is, the microcomputer for camera 11, receiving a request for transmitting data of the address A1 of the E²PROM 12 from the microcomputer for imprinting 13, transmits the data of the address A1 of the E²PROM 12.to the microcomputer for imprinting 13 at steps 60 and 61. The microcomputer for camera 11, receiving a request for transmitting data of the address A2 of the E²PROM 12 from the microcomputer for imprinting 13, transmits the data of the address A2 of the E²PROM 12 to the microcomputer for imprinting 13 at steps 62 and 63. In the same way, the microcomputer for camera 11 transmits data of addresses which are requested by the microcomputer for imprinting 13 to the microcomputer for imprinting 13.

Figure 9:
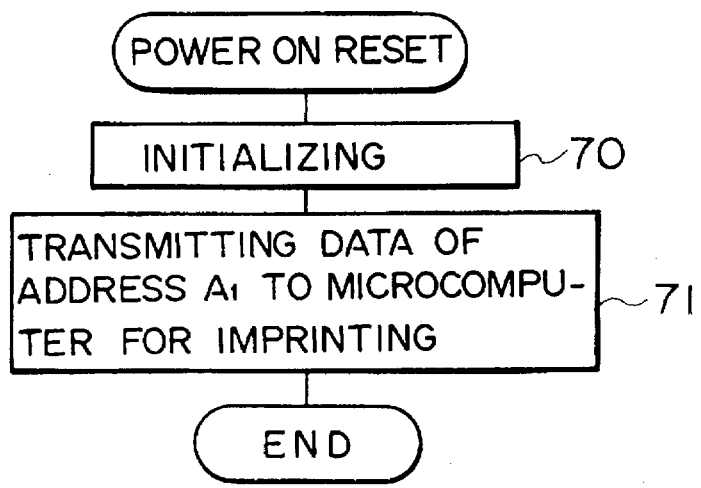
FIG. 9 is a flow chart of the microcomputer for camera of FIG. 2, showing a processing of power on reset.

FIG. 9 is a flow chart of the microcomputer for camera 11, showing the processing of power on reset. When the battery 21 is loaded, a power on reset signal is given from the auto reset circuit 23 to the microcomputer for camera 11. By this, the microcomputer for camera 11 starts the power on reset of FIG. 9. The microcomputer for camera 11 enters a step 71 through an initialization of a step 70, and transmits data of the address A1 of the E²PROM 12 to the microcomputer for imprinting 13 and finishes the power on reset.

According to a control like this, when the character string fixing switch 20 is made on, character strings prepared by the camera user are transmitted from the microcomputer for imprinting 13 to the microcomputer for camera 11, and written to the E²PROM 12 by the microcomputer for camera 11. Character strings written to E²PROM 12 are set selectively when the character string select switch 19 is made on under a condition that the imprint mode is set to the free mode. When the battery 21 is loaded, a character string of the address A1 of the E²PROM 12 is loaded to the RAM of the microcomputer for imprinting 13 by the microcomputer for camera 11.

As described in detail, according to the present embodiment, character strings prepared under the free mode are written to an E²PROM, and the character strings written to the E²PROM are read out and imprinted to pictures. Because of this, character strings prepared by the camera user are preserved without being destructed even when the power source is shut down because the battery is unloaded or used up, and more character strings can be stored according to the memory capacity of E²PROM.

From the foregoing it will now be apparent that a new and improved data imprinting device of a camera has been found. It should be understood, of course, that the embodiments disclosed are merely illustrative and are not intended to limit the scope of the invention. Reference should be made to the appended claims, therefore, rather than the specification as indicating the scope of the invention.

What is claimed is:

1. A data imprinting device of a camera, having plural imprint modes including a free mode for imprinting character strings which are prepared by each camera user, for imprinting data displayed on an imprint display unit according to each of imprint modes to be set selectively, comprising:

an electrically rewritable non-volatile memory E²PROM;

character string assembling means, responsive to the setting of said free mode and a first external operation, for assembling a character string as desired by the camera user, and for writing an assembled character string into said E²PROM in response to the first external operation each time a character string is assembled, including:

a character change switch, a character select switch, and a character fixing switch which are operated externally;

starting means, responsive to the setting of said free mode and said character change switch, for setting a first character of a character string as an objective of change;

preparing means, responsive to said starting means, said character select switch and said character fixing switch, for shifting a character to be changed to another character in a prescribed order each time said character select switch is made on, and for fixing the character to be changed, and shifting the objective of change to a next character of the character string when said character fixing switch is made on;

first character string reading means, responsive to the setting of said free mode and a second external operation, for reading one of character strings stored in said E²PROM each time the second external operation is actuated;

first display controlling means, responsive to said character string assembling means and said first character string reading means, for displaying a character string which is being assembled and for displaying a character string which is read out from said E²PROM on said imprint display unit;

second character string reading means, responsive to the loading of a battery to the camera, for reading a character string stored in a prescribed address of said E²PROM; and second display controlling means, responsive to the setting of said free mode and said second character string reading means, for displaying a character string of said prescribed address on said imprint display unit when the free mode is set for the first time after the battery is loaded to the camera.

2. The data imprinting device of claim 4, wherein said character string assembling means further includes:

a character string fixing switch which is operated externally; and writing means, responsive to the setting of said free mode and said character string fixing switch, for writing the character string which is displayed on said imprint display unit to said E²PROM replacing a preceding character string when said character string fixing switch is made on.

3. The data imprint device of claim 1, wherein said first character string reading means comprise:

an externally operated character string select switch; and reading means, responsive to the setting of said free mode and said character string select switch, for reading a character string which is stored in said E²PROM, in a prescribed order and based on an address of a character string which is displayed on said imprint display unit, each time said character string select switch is made on.

4. A data imprinting device for a camera, having at least one imprint mode including at least one of a free mode for imprinting alphanumeric character data strings prepared by a camera user and an off mode disabling imprinting, and for imprinting data which are displayed on an imprint display unit according to each mode, respectively, comprising:

an electrically rewritable non-volatile memory E²PROM;

set mode switch, selectively actuated by the camera user, for setting an operating mode including one of at least a free mode and an off mode;

alphanumeric character string assembler, responsive to the set mode switch, for assembling alphanumeric character strings including:

alphanumeric character change switch, selectively actuated by the camera user, for scrolling through a list of alphanumeric characters; and next character position shift switch, selectively actuated by the camera user, for shifting to a next character position;

the assembler assembling strings as a function of the actuation of the change switch and shift switch, respectively, character string storing switch, actuated by the camera user each time a character string is assembled, for storing an assembled character string into said E²PROM each time a character string is assembled;

first character string reading means, responsive to the setting of the free mode and an external operation, for reading one of character strings stored in said E²PROM each time the external operation is actuated;

a first display controller, responsive to the assembler and the reading means, for displaying a character string which is being assembled and for displaying a character string which is read out from said E²PROM on the imprint display unit;

second character string reading means, responsive to the loading of a battery to the camera, for reading a character string stored in a prescribed address of said E²PROM; and a second display controller, responsive to the setting of said free mode and said second character string reading means, for displaying a character string of said prescribed address on said imprint display unit when the free mode is set for the first time after the battery is loaded to the camera.

5. A data imprinting device of a camera, having plural imprint modes including a free mode for imprinting character strings which are prepared by each camera user, for imprinting data displayed on an imprint display unit according to each of imprint modes to be set selectively, comprising:

an electrically rewritable non-volatile memory E²PROM;

character string assembling means, responsive to the setting of said free mode and a first external operation, for assembling a character string as desired by the camera user, and for writing an assembled character string into said E²PROM in response to the first external operation each time a character string is assembled;

first character string reading means, responsive to the setting of said free mode and a second external operation, for reading one of character strings stored in said E²PROM each time the second external operation is actuated;

first display controlling means, responsive to said character string assembling means and said first character string reading means, for displaying a character string which is being assembled and for displaying a character string which is read out from said E²PROM on said imprint display unit;

second character string reading means, responsive to the loading of a battery to the camera, for reading a character string stored in a prescribed address of said E²PROM; and second display controlling means, responsive to the setting of said free mode and said second character string reading means, for displaying a character string of said prescribed address on said imprint display unit when the free mode is set for the first time after the battery is loaded to the camera.

6. A data imprinting device of claim 5, wherein said character string assembling means includes:

a character change switch, a character select switch, a character fixing switch and a character string fixing switch which are operated externally;

starting means, responsive to the setting of said free mode and said character change switch, for setting a first character of a character string as an objective of change;

preparing means, responsive to said starting means, said character select switch and said character fixing switch, for shifting a character to be changed to another character in a prescribed order each time said character select switch is activated, and for fixing the character to be changed and shifting the objective of change to a next character of the character string when said character fixing switch is activated; and writing means, responsive to the setting of said free mode and said character string fixing switch, for writing the character string which is displayed on said imprint display unit to said E²PROM replacing a preceding character string when said character string fixing switch is activated.

7. A data imprinting device of claim 5, wherein said first character string reading means includes:

a character string select switch which is operated externally;

reading means, responsive to the setting of said free mode and the character string select switch, for reading one of character strings stored in said E²PROM, in a prescribed order and based on an address of a character string which is displayed on the imprint display unit, each time the character string select switch is activated.

* * * * *